United States Patent [19]

Takimoto et al.

[11] Patent Number: 4,522,084
[45] Date of Patent: Jun. 11, 1985

[54] STEERING WHEEL FOR A VEHICLE

[75] Inventors: Masahiro Takimoto, Aichi; Satoshi Ota, Konan, both of Japan

[73] Assignee: Toyoda Gosei Co., Ltd., Nishikasugai, Japan

[21] Appl. No.: 541,000

[22] Filed: Oct. 11, 1983

[30] Foreign Application Priority Data

Oct. 30, 1982 [JP] Japan ................... 57-190946

[51] Int. Cl.³ ........................... C08K 5/57; B62D 1/04
[52] U.S. Cl. ..................................... 74/557; 74/558.5; 74/558; 428/319.7; 428/424.6; 524/147; 524/178
[58] Field of Search ................ 74/557, 558, DIG. 10, 74/558.5; 525/129; 428/159, 319.7, 424.6; 524/147, 178

[56] References Cited

U.S. PATENT DOCUMENTS

| 3,257,261 | 6/1966 | Hochberg | 428/424.6 |
| 3,446,694 | 5/1969 | Hoskinson et al. | 428/319.7 |
| 3,501,370 | 3/1970 | Juredine | 428/319.7 |
| 3,600,266 | 8/1971 | Huntzinger | 428/319.7 |
| 3,802,291 | 4/1974 | Young et al. | 74/558 |

Primary Examiner—Veronica P. Hoke
Attorney, Agent, or Firm—Cushman, Darby & Cushman

[57] ABSTRACT

A steering wheel for a vehicle formed from a molded polyurethane resin and a molded vinyl chloride resin which contains a heat stabilizer consisting of (I) 1 to 3 phr of the organo maleate, (II) 1 to 4 phr of zinc soap and 0.3 to 1.0 phr of an organo-phosphite, or (III) 1 to 3 phr of organotin maleate, 1 to 4 phr of zinc soap and 0.3 to 1.0 phr of an organo-phosphite.

6 Claims, 7 Drawing Figures

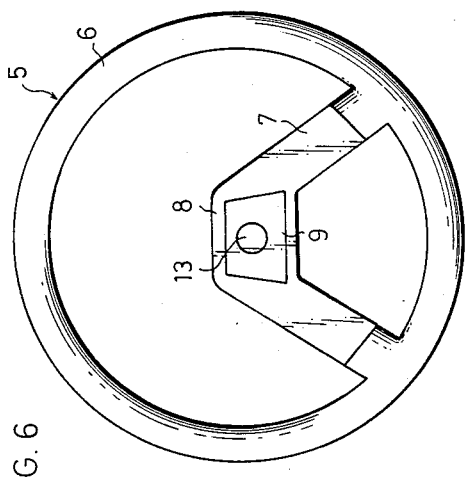
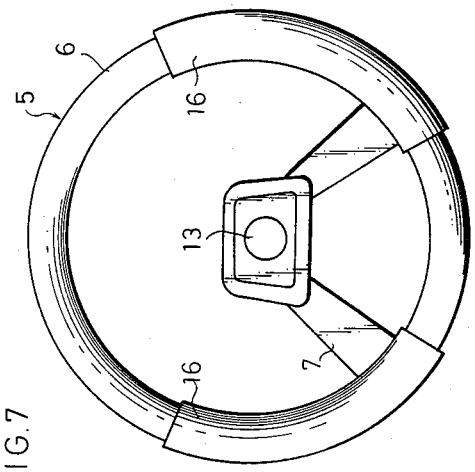
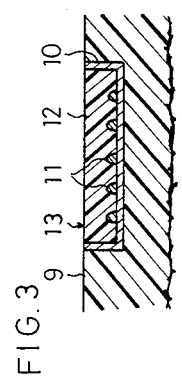
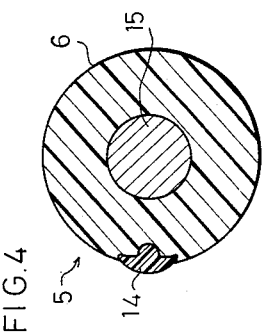
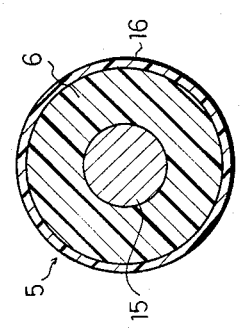
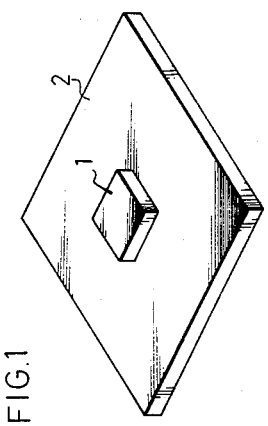
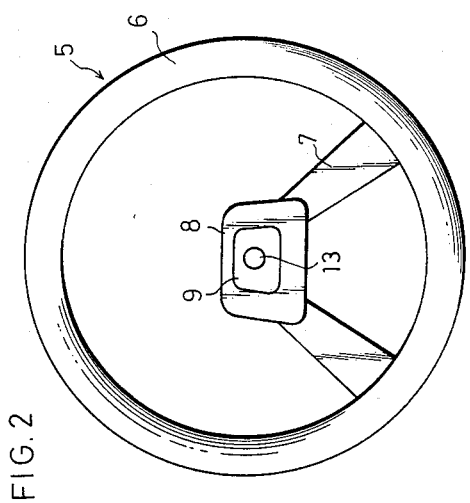

STEERING WHEEL FOR A VEHICLE

BACKGROUND OF THE INVENTION

1. Field of the Invention

This invention relates to a steering wheel for an automobile or other vehicle which is formed from a polyurethane resin molding and a vinyl chloride resin molding.

2. Description of the Prior Art

It is necessary to form the ring portion of a steering wheel from a material which is soft and smooth to the touch. There has recently been a sharp increase in the use for a steering wheel of a reaction injection molded urethane foam which is not only soft and easy to color, but also durable for a long time, which is another important requirement for a steering wheel. Soft polyvinyl chloride has long been used to form a pad for a steering wheel, since it is excellent in moldability, widely variable in hardness and highly durable.

Performance tests have, however, revealed the presence of a certain problem in a steering wheel having a ring portion formed from reaction injection molded urethane and a pad formed from soft polyvinyl chloride. The soft polyvinyl chloride turned red when the tests were conducted under the severe thermal conditions to which the steering wheel of an automobile might be exposed. This change in color was not found in the soft polyvinyl chloride pad in a steering wheel having a ring portion formed from polypropylene, cellulose acetate, wood or soft polyvinyl chloride.

SUMMARY OF THE INVENTION

The inventor of this invention has made an extensive study of the problem, and found that the change in the color of soft polyvinyl chloride is due to the action of a very small quantity of volatile matter produced by the reaction injection molded urethane.

It is an object of this invention to provide a steering wheel formed from polyurethane and polyvinyl chloride in which no or virtually no change in the color of the polyvinyl chloride is caused by the volatile matter produced in a very small quantity by the polyurethane.

This object is attained by the use of polyvinyl chloride to which a specific heat stabilizer has been added.

BRIEF DESCRIPTION OF THE DRAWINGS

FIG. 1 is a perspective view of a test specimen formed from polyurethane and polyvinyl chloride;

FIG. 2 is a front elevational view of a steering wheel according to a first embodiment of this invention;

FIG. 3 is a cross sectional view of a potting mark in the steering wheel of FIG. 2;

FIG. 4 is a cross sectional view of a ring portion in a modified form of the steering wheel shown in FIG. 2;

FIG. 5 is a view similar to FIG. 4, but showing another modified form;

FIG. 6 is a front elevational view of a steering wheel according to a second embodiment of this invention; and FIG. 7 is a front elevational view of a steering wheel according to a third embodiment of this invention.

DETAILED DESCRIPTION OF THE INVENTION

A series of tests were conducted to examine a change in color which polyvinyl chloride might show when heated in intimate contact with polyurethane. A variety of heat stabilizers were used for polyvinyl chloride. Polyurethane was prepared by employing 100 parts by weight of a trifunctional polyether polyol having a molecular weight of 5,000, 48 parts by weight of a methylene diisocyanate prepolymer (NCO: 26%), one part by weight of triethylenediamine as a catalyst, 10 parts by weight of 1,4-butanediol as a crosslinking agent, 15 parts by weight of Freon 11 (trichlorofluoromethane) as a foaming agent and 0.5 part by weight of silicone oil as a surface active agent. Soft polyvinyl chloride was prepared by employing 100 parts by weight of a suspension polymerized straight resin having a medium degree of polymerization, 100 parts by weight of a plasticizer consisting essentially of phthalic acid, 30 parts by weight of a filler, and at least one heat stabilizer selected from organotin maleate, zinc soap and organo-phosphite of which the quantity is shown in TABLE 1.

A 5 mm square, 2 mm thick test specimen 1 of polyurethane was placed on the center of a 20 mm square, 2 mm thick test specimen 2 of polyvinyl chloride in intimate contact therewith, as shown in FIG. 1. They were placed in a closed glass container having a diameter of 70 mm and a height of 20 mm, and it was left for five hours in a Geer oven maintained at a temperature of 90° C. The conditions under which the tests were conducted are believed to have been more severe than those to which an automobile is actually subjected, since the polyurethane and soft polyvinyl chloride were kept in intimate contact with each other in a closed container having a small volume. The tests were conducted using various specimens of soft polyvinyl chloride containing different heat stabilizers as shown in TABLE 1 to compare the degree of a change in the color of polyvinyl chloride. The results are shown in TABLE 1. The quantity of each heat stabilizer is shown in phr (part or parts per hundred parts of resin). The alphabetical letters showing the degree of a change in the color of polyvinyl chloride will be explained in TABLE 3.

TABLE 1

| | Sample | | | | | | |
|---|---|---|---|---|---|---|---|
| | 1 | 2 | 3 | 4 | 5 | 6 | 7 |
| Heat stabilizer (phr) | | | | | | | |
| Organo maleate | 2 | | | | | | |
| Zinc soap | | | 0.5 | 1 | 2 | 3 | 1 |
| Organo phosphite | | 0.5 | 0.5 | 0.5 | 0.5 | 0.5 | |
| Degree of change in color | A | E | C | B | B | A | C |

Other specimens of polyvinyl chloride containing other heat stabilizers were also tested for comparative purposes, as shown in TABLE 2.

TABLE 2

| | Sample | | | | | | | |
|---|---|---|---|---|---|---|---|---|
| | 8 | 9 | 10 | 11 | 12 | 13 | 14 | 15 |
| Heat stabilizer (phr) | | | | | | | | |
| Organotin laurate | 2 | | | | | | | |
| Organotin mercaptide | | 2 | | | | | | |
| Lead soap | | | 2 | | | | | |
| Barium soap | | | | 2 | | | | |
| Calcium soap | | | | | | 2 | 1 | 1 |
| Epoxy soyabean oil | | | | | | | | 1 |
| Zinc soap | | | | | | | 1 | 1 |
| Organo-phosphite | | | | | | | 0.5 | 0.5 |

TABLE 2-continued

| | Sample | | | | | | |
|---|---|---|---|---|---|---|---|
| | 8 | 9 | 10 | 11 | 12 | 13 | 14 | 15 |
| Degree of change in color | E | D | D | D | D | D | B | B |

TABLE 3

| A: | No change. |
|---|---|
| B: | Slight change in a part of the area in which polyvinyl chloride was in intimate contact with polyurethane. |
| C: | Change in the whole area of intimate contact. |
| D: | Change not only in the area of intimate contact, but also in other areas. |
| E: | Change in more than a half of the entire area of the polyvinyl chloride specimen. |

The test results indicate that in order to prevent a change in the color of polyvinyl chloride by a very small quantity of volatile matter from polyurethane, it is preferable to employ as a heat stabilizer for polyvinyl chloride 1 to 3 phr of organotin maleate, or a combination of 1 to 4 phr of zinc soap and 0.3 to 1.0 phr of an organo-phosphite. It is also possible to use a combination of organotin maleate, zinc soap and an organo-phosphite in the quantities hereinabove mentioned.

The invention will now be described in further detail with reference to the drawings. Referring first to FIGS. 2 and 3, there is shown a steering wheel 5 according to a first embodiment of this invention. The steering wheel 5 has a ring portion 6 formed from reaction injection molded urethane of the same composition as the polyurethane used in the tests hereinbefore described. The ring portion 6 has spokes 7, and a boss 8 is attached to the spokes 7 to support the ring portion 6. The boss 8 is formed from soft polyvinyl chloride. This soft polyvinyl chloride is prepared by mixing 100 parts by weight of a suspension polymerized straight resin having a medium degree of polymerization, 100 parts by weight of a plasticizer consisting essentially of phthalic acid, 30 parts by weight of a filler, such as calcium carbonate, and two parts by weight of a heat stabilizer, such as an alkyl-organotin maleate monomer.

A pad 9 is disposed in the center of the boss 8, and formed from the same soft polyvinyl chloride. A potting mark 13 is provided in the center of the pad 9. The potting mark 13 comprises an aluminum casing 10 embedded in the pad 9, a transparent urethane resin 12 in the casing 10, and a plurality of marking members 11 in the urethane resin 12.

The soft polyvinyl chloride forming the boss 8 and the pad 9 does not change its color, even if it is exposed to the volatile matter generated in a very small quantity by the polyurethane of the ring portion 6 and the potting mark 13 with a rise in temperature.

A modified form of the steering wheel is shown in FIG. 4. The steering wheel 5 includes an annular member 14 attached to the outer circumference of the ring portion 6, and is identical in all the other respects to the steering wheel of FIGS. 2 and 3. The annular member 14 is formed from soft polyvinyl chloride prepared by employing 3 phr of zinc soap and 0.5 phr of trialkylphosphite as a heat stabilizer. FIG. 4 also shows a metallic core 15 in the ring portion 6.

Referring to FIG. 5, another modified form of the steering wheel 5 includes a cover 16 formed from soft polyvinyl chloride and surrounding the whole ring portion 6. This soft polyvinyl chloride is prepared by employing 2 phr of an alkyltin maleate monomer, 3 phr of zinc soap and 0.5 phr of trialkylphosphite as a heat stabilizer.

Referring to FIG. 6, there is shown a second embodiment of this invention. This steering wheel differs from the steering wheel of FIGS. 2 and 3 in that the spokes 7 and the boss 8 constitute an integral assembly formed from polyvinyl chloride.

A third embodiment of this invention is shown in FIG. 7. It differs from the steering wheel of FIGS. 2 and 3 in that it includes a pair of substantially diametrically oppositely disposed handle covers 16 similar to the cover shown in FIG. 5, and formed from polyvinyl chloride.

The organotin maleate used as a heat stabilizer for polyvinyl chloride in accordance with this invention includes an alkyltin maleate polymer, and a salt of a half ester of maleic acid and alkyltin oxide, in addition to the alkyltin maleate monomer hereinabove mentioned by way of example.

Likewise, the zinc soap includes a stearate, a palmitate, a laurate, a salt of erucic acid, a behenate, an octylate, a p-tert-butylcarboxylate and a p-tert-butylbenzoate.

Moreover, the organo-phosphite includes not only trialkylphosphite, but also triphenylphosphite, alkylphenylphosphite and a phosphite having an alkoxy group.

While the invention has been described with reference to several embodiments thereof, it is to be understood that modifications or variations may be easily made by anybody of ordinary skill in the art without departing from the scope of this invention which is defined by the appended claims. For example, it is possible to use another polyurethane instead of reaction injection molded urethane, or hard polyvinyl chloride, instead of soft polyvinyl chloride. It is also possible to employ a ring portion formed from polyvinyl chloride and a pad formed from polyurethane.

What is claimed is:

1. In a vehicle steering wheel formed from a molded polyvinyl chloride resin which is in physical contact with a molded polyurethane resin, the improvement wherein said molded polyvinyl chloride resin contains a color change-inhibiting amount of a heat stabilizer selected from the group consisting of:
   (i) 1 to 3 phr of an organotin maleate; and
   (ii) 1 to 4 phr of a zinc soap and 0.3 to 1.0 phr of an organo-phosphite.

2. A steering wheel as set forth in claim 1 in which the organotin maleate is an alkyltin maleate.

3. A steering wheel as set forth in claim 1 in which the organo-phosphite is selected from the group consisting of a trialkylphosphite, an alkylphenylphosphite and an alkoxy-phosphite.

4. A steering wheel as set forth in claim 1, wherein at least one of the boss and pad of said steering wheel is formed from said vinyl chloride resin, and at least one of the ring portion and spokes of said steering wheel is formed from said polyurethane resin.

5. A steering wheel as set forth in claim 1, wherein at least one of the boss and pad of said steering wheel is formed from said polyurethane resin, and at least one of the ring portion and spokes of said steering wheel is formed from said vinyl chloride resin.

6. A steering wheel as set forth in claim 1, wherein said vinyl chloride resin is a soft polyvinyl chloride which contains a suspension polymerized straight resin having a medium degree of polymerization, a plasticizer, a filler and a heat stabilizer.

* * * * *